Sept. 29, 1970   J. M. GEARIN   3,530,548
CABLE COUPLING
Filed April 4, 1968   3 Sheets-Sheet 1
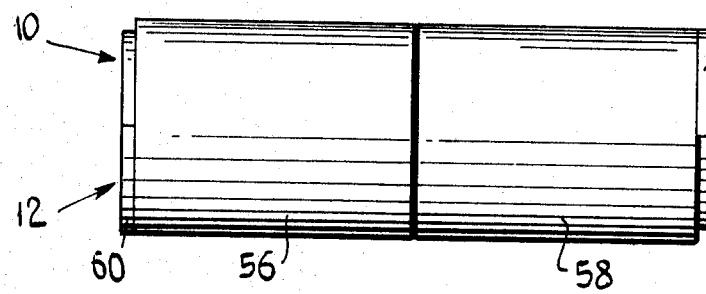
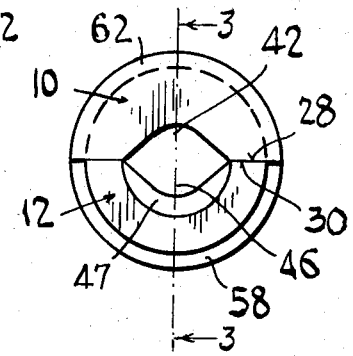
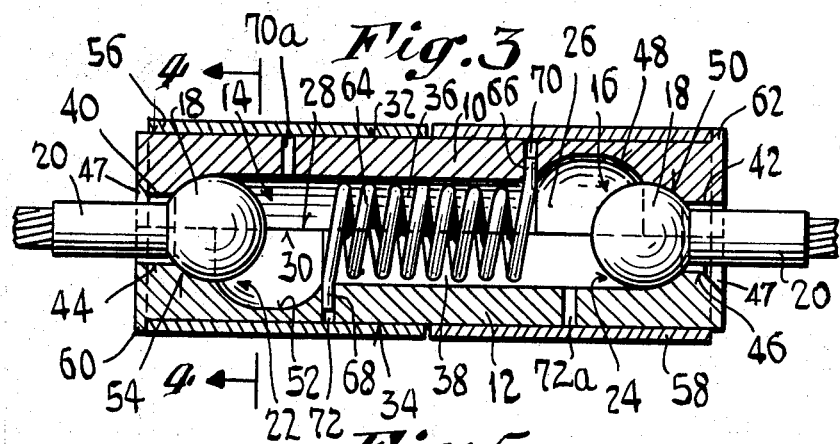
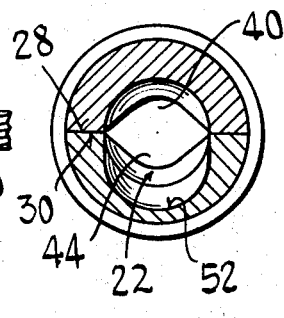
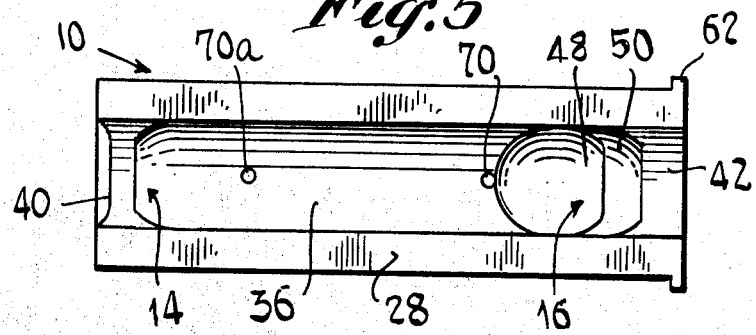
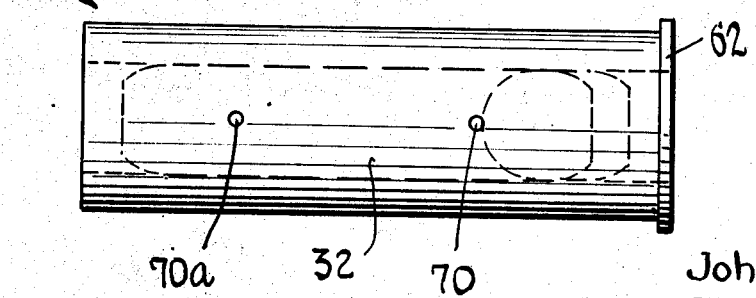
INVENTOR.
John M. Gearin
BY
H. Gibson Lehmann
AGENT Sept. 29, 1970   J. M. GEARIN   3,530,548
CABLE COUPLING
Filed April 4, 1968   3 Sheets-Sheet 2
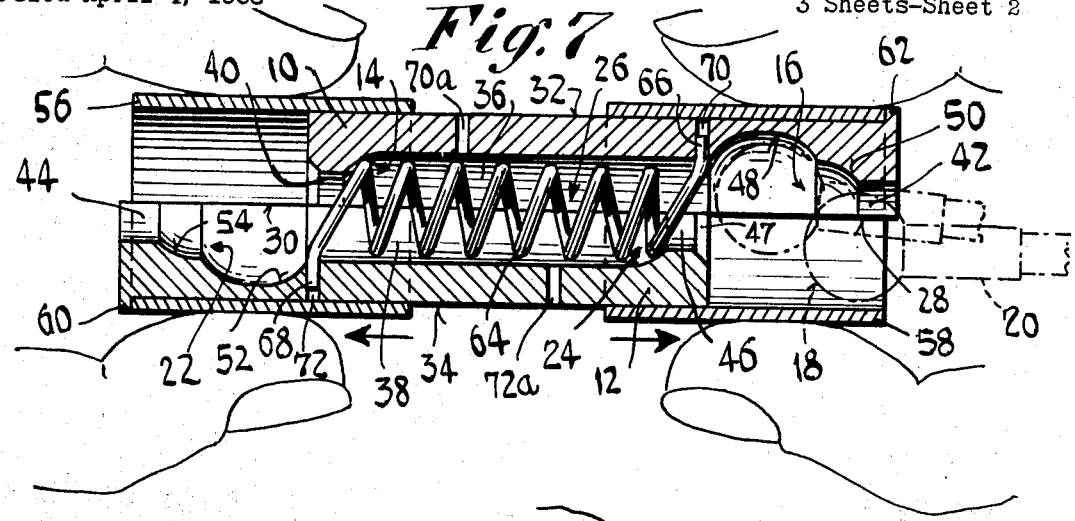
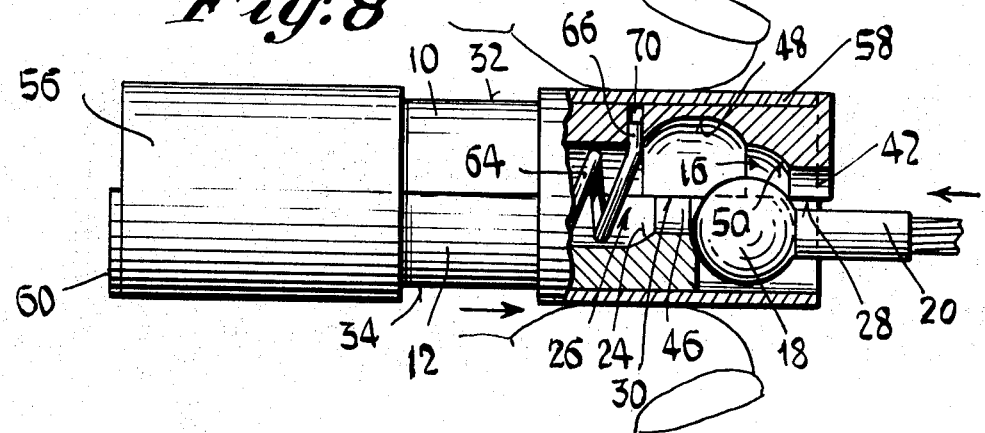
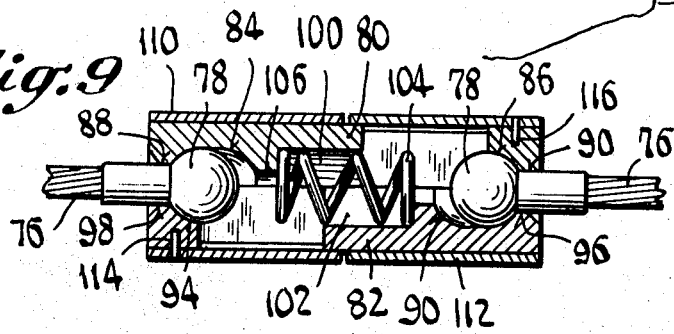
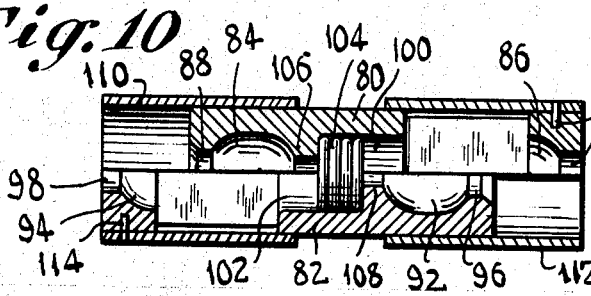
INVENTOR.
John M. Gearin
BY
AGENT Sept. 29, 1970  J. M. GEARIN  3,530,548
CABLE COUPLING
Filed April 4, 1968  3 Sheets-Sheet 3
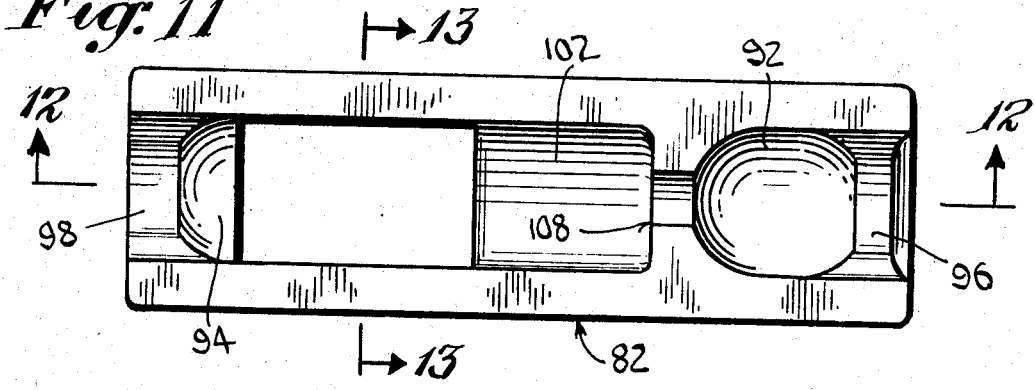
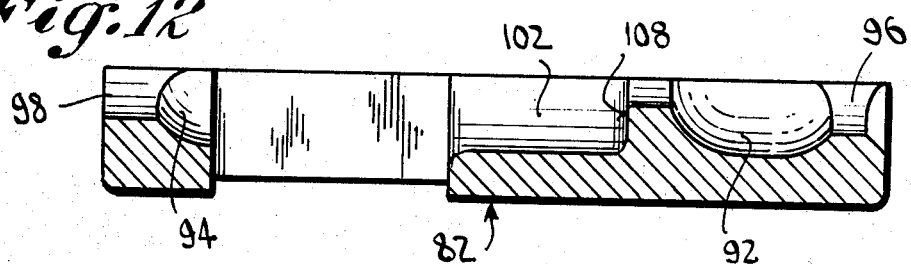
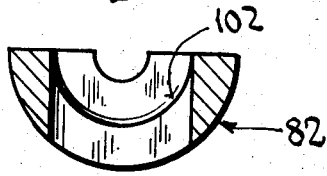
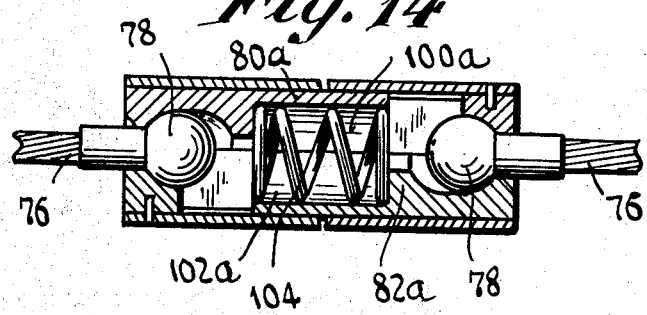
INVENTOR.
John M. Gearin
BY
H. Gibner Lehmann
AGENT United States Patent Office  3,530,548
Patented Sept. 29, 1970

3,530,548
CABLE COUPLING
John M. Gearin, Brookfield, Conn., assignor to Norco, Inc., Ridgefield, Conn., a corporation of Connecticut
Filed Apr. 4, 1968, Ser. No. 718,755
Int. Cl. F16g *11/14;* A44b *11/25*
U.S. Cl. 24—123                               7 Claims

ABSTRACT OF THE DISCLOSURE

A manually operable tubular coupling having open ends to receive enlargements on cable or rod-like parts. The body of the coupling consists of two spring-urged identical halves having a line of separation along a diametric plane, the halves being slidable longitudinally on each other from aligned or coextensive positions so as to reveal interior cooperable socket configurations which are thereby made accessible for receiving the cable enlargements. Two collars on the body prevent lateral separation of the halves and, when shifted apart, effect the relative sliding disalignment to make the sockets accessible.

CROSS REFERENCES TO RELATED APPLICATIONS (1) Copending application Ser. No. 521,358 filed Jan. 18, 1966, now Pat. No. 3,378,891 in the name of Joseph R. Metz, entitled "Cable Enlargement Clasp," having common ownership with the present invention and application.

(2) Copending application Ser. No. 627,776 filed Apr. 3, 1967, now Pat. No. 3,413,692 in the name of Clarence G. Pressley, entitled "Fastener Having Predetermined Load Release," having common ownership with the present invention and application.

PRIOR ART PATENTS OF INTEREST (1) U.S. Pat. No. 2,305,234.
(2) U.S. Pat. No. 2,556,117.
(3) U.S. Pat. No. 3,332,117.

BACKGROUND OF THE INVENTION

This invention relates to quick-release connectors or couplings, and more particularly to connectors adapted to secure together cables, strands or the like which carry enlargements at their ends.

A prior connector of this type involved an open-sided elongate body portion having side-and-end-opening sockets at its ends, which received the cable enlargements and cable ends by a side-wise movement. Two locking and release collars separated by an exterior coil spring were slidable on the body to reveal or else to cover the side openings of the sockets, thereby to provide access or to close the sockets for purposes of attachment and release of the connector. While this arrangement was satisfactory for many purposes, there were drawbacks in that the coil spring was fully exposed to the surrounding environment, as were portions of the open side of the connector body. Dirt and contamination could thus adversely affect the operation and construction of the connector.

SUMMARY

The above drawbacks and disadvantages of prior quick-release connectors of the kind indicated are obviated by the present invention, and one object of the invention is to provide a novel and improved quick-release connector for cable ends and the like, which has a virtually fully enclosed construction and appearance enabling it to exclude dirt, foreign matter, contamination and the like whereby its operation is not adversely affected by these factors. This is accomplished by the provision of a novel connector wherein a tube-like body has two identical spring-urged halves separated along a diametric plane and slidable one on the other. The outer peripheral surfaces of the two halves, in one embodiment, present an unbroken or continuous cylindrical exterior when the halves are aligned or coextensive with each other, and the biasing spring is disposed in the bore formed by the halves, thereby making for a closed exterior. Cooperable socket depressions at the inner sides of the body halves are exposed to receive or release cable enlargements only when the halves are disaligned by relative longitudinal movement. Two collars on the body halves also effect a closed exterior and additionally serve to maintain the coextensive positioning of the halves, and to effect the disaligning movement when they are manually spread apart. In another embodiment the body halves by themselves do not provide the completely closed construction, but the collars do when the connector is operable. Thus in any circumstance the device presents a closed appearance and exterior.

Other objects and advantages reside in the provision of an improved quick-release connector as above set forth, which is especially sturdy and failure resistant, simple in its construction, easily operated and foolproof, and economical to fabricate; and a connector in accordance with any or all of the foregoing, which cannot be inadvertently or accidentally released when under load.

Other features and advantages will hereinafter appear.

In the drawings:

FIG. 1 is a side elevational view of one embodiment of the present improved quick-release connector for cables and the like, incorporating an extension-type spring means.

FIG. 2 is an end elevational view of the connector of FIG. 1.

FIG. 3 is a longitudinal sectional view, enlarged, taken on the line 3—3 of FIG. 2 and illustrating additionally a pair of coupled cable ends.

FIG. 4 is a transverse sectional view, taken on the line 4—4 of FIG. 3.

FIG. 5 is a top plan view of one of the elongate body halves of the connector.

FIG. 6 is a bottom plan view of the connector half shown in FIG. 5.

FIG. 7 is an axial sectional view similar to that of FIG. 3 but showing the body halves disaligned or shifted longitudinally with respect to each other, for the purpose of receiving or releasing a cable end (illustrated in broken outline).

FIG. 8 is a view of the connector partly in side elevation and partly in axial section, illustrating another method of attaching a cable end.

FIG. 9 is an axial sectional view of a connector and coupled cables, constituting another embodiment of the invention wherein the spring means is of the compression type.

FIG. 10 is a view like that of FIG. 9 but showing the cable ends removed and the connector parts in their releasing positions.

FIG. 11 is a top plan view of one body half, of the connector of FIGS. 9 and 10.

FIG. 12 is a longitudinal section through the body half of FIG. 11, taken on the line 12—12 thereof.

FIG. 13 is a transverse section of the body half, taken on line 13—13 of FIG. 11.

FIG. 14 is an axial sectional view of a connector constituting yet another embodiment of the invention, wherein a compression spring means is wholly confined against sidewise movement.

Referring first to FIGS. 1–8, the improved quick-release coupling or connector shown therein comprises a pair of elongate body members 10, 12 each of which has a pair of sockets in one side. The body member 10 has sockets designated generally 14, 16 disposed in its inner flat side, respectively adjacent and opening into its ends and adapted to receive bulbous enlargements such as balls 18 carried by end portions 20 of cables which are to be connected together. The body member 12 also has in its inner flat side a pair of sockets 22, 24 adjacent and opening into its ends and adapted to cooperate respectively with the sockets 14, 16 for the purpose of nesting and gripping the cable enlargements 18.

Preferably the body members 10 and 12 are identical to each other and arranged with their dissimilar ends adjoining each other. Accordingly, the sockets 14, 24 can be identical, this same being true of the sockets 16 and 22.

When the body members 10, 12 are assembled as illustrated in FIG. 3 and disposed in alignment with each other, that is, so as to be coextensive, they form in effect a tube-like body structure having a central bore 26 communicating with the socket formations 14, 16, 22 and 24. Also, the body members 10, 12 have their flat sides 28, 30 engageable with and slidable on each other whereby the tube-like body formation has a line of separation along a diametric plane.

Further, preferably the body members 10, 12 have semi-cylindrical outer peripheral surfaces 32, 34 respectively which together form a closed cylindrical exterior when the body members are asembled and in alignment as shown in FIG. 3.

The bore 26 of the tube-like body configuration is constituted of two longitudinal grooves, one being the groove 36 in the member 10 which communicates with the socket formations 14, 16 and the other being the groove 38 in the body member 12, which communicates with the socket formations 22, 24.

The socket formations 14, 16, 22 and 24 include end openings or semi-circular notches 40, 42, 44 and 46 respectively, which provide clearance for the end portions of the cables 20 as seen in FIG. 3. The notches 40, 46 have bevels 47 as shown. The socket formations 14, 24 are shown as rounded or semi-spherical ends of the grooves 36, 38 respectively whereas the socket formations 16, 22 comprise large and small semi-spherical surfaces of revolution designated respectively 48, 50 and 52, 54. The smaller surfaces of revolution 50, 54 adjoin the end notches 42, 44 respectively, as clearly seen in FIG. 7.

The socket portions 48, 50 and 52, 54 are so arranged that the smaller portions 50, 54 supplement the sockets 24, 14 respectively to accommodate the ball enlargements 18, as clearly shown in FIG. 3. Also, the larger socket portions 48, 52 are sufficiently deep in the body members 10, 12 to accommodate the balls 18 with enough clearance provided by the notches 40, 46 to permit return movement of the body members to the aligned or coextensive positions of FIG. 3 from the FIG. 7 positions, when the cable enlargements are in place. The reverse of this movement is also made possible in the following manner. Considering FIG. 3, the load is first removed from the cables 20 so that the cables are free to shift inward or toward each other. Then, when longitudinal separating forces are applied to the body members 10, 12, such reverse or disaligning movement can be easily effected, by means now to be disclosed.

For the purpose of yieldably holding the body members 10, 12 in their aligned or coextensive positions as shown in FIG. 3, and to enable the body members to be slid on each other relatively longitudinally to the releasing positions of FIG. 7 or FIG. 8, locking and release collars 56, 58 are provided, slidably carried by the assembled body members and conforming to the cylindrical external surface of these, as by having a circular or cylindrical, ring-like shape. Normally, as seen in FIG. 3 the locking and release collars 56, 58 can have their adjoining ends in engagement with each other, and the combined lengths of the collars is slightly less than the lengths of the body members 10, 12. Also, the body members 10, 12 have abutment shoulders in the form of semi-circular end flanges 60, 62 respectively, adapted to engage the locking and release collars 56, 58 respectively.

By such arrangement, when the collars 56, 58 are spread apart as indicated in FIG. 7, they will carry with them the associated flanges 60, 62 and body members 12, 10 having such flanges. As a consequence, the relative longitudinally shifted positions of the body members shown in FIG. 7 will be attained. Normally the body members 10, 12 and the locking and release collars 56, 58 are biased or maintained in the closed or aligned positions of FIG. 3, this being effected by a helical extension spring 64 which is wholly enclosed, being carried in the bore 26 of the connector and having radially extended ends 66, 68 received respectively in holes 70, 72 of the body members 10, 12.

In FIG. 7 the spring 64 is stretched and tends to return the body members and collars to the closed or aligned positions of FIG. 3. For the FIG. 3 position the spring 64 is still under some tension, thereby to maintain the alignment and closed condition indicated.

Considering FIG. 3, if the release sleeves or collars 56, 58 should be grasped and spread apart while no load is being experienced by the cables 20, this action will bring the ball enlargements 18 of the cables into the socket portion 48, 52 respectively, and as the spreading apart movement of the collars 56, 58 is continued, the positions of FIG. 7 will be reached whereupon the cables and cable enlargemens 20, 18 will be free for removal from the connector. Sufficient clearance is provided by the notches 42, 44 to permit such removal even though the release collars are still encircling the sockets 60, 22.

FIG. 8 illustrates another method by which the cable enlargements may be inserted in the connector. In this figure, the collar 58 is shown as being grasped by the fingers of one hand. The cable 20 shown in this figure may be grasped by the other hand, and the ball enlargement thereof forced into the end of the connector adjacent the collar 58, as illustrated. This action will effect a retraction of the body half 12 with respect to the collar 58, with the result that the cable enlargement 18 can be forced into the socket portion 48 whereupon the spring 64 will return the body half 12 to the locked position illustrated in FIG. 3. The bevel 47 greatly aids in this type of assembly.

The semi-circular flanges 60, 62 constitute driving connections between the body members 12, 10 and the respective release collars 56, 58 as will be understood. Also, it will be seen that the release collar 56 could be rigidly affixed to the body member 12, and also the release collar 58 could be rigidly affixed to the body member 10 without impairing the operation of the connector. Thus, the provision of the semi-circular flanges 60, 62 constitutes one convenient way of effecting a driving connection which can obviate the necessity for effecting a rigid securement of the collars to the associated body members.

The assembly of the connector is as follows: One sleeve is put on each body half, and then the body halves and sleeves are assembled to the positions of FIG. 7. The spring 64 is then pulled into the bore 26 by attaching a suitable pulling tool to one end of the spring. Thereafter, the spring ends are fitted into the holes 70, 72 of the body members whereupon the device will automatically tend to close to the retracted, assembled position of FIG. 3.

The spring 64, instead of being an extension spring, could instead be a compression spring if its ends were anchored differently. For example, the body half 10 could have another spring anchorage hole 70a at a different location, and the body half 12 could have another spring anchorage hole 72a at another location, all as shown in FIGS. 3, 5, 6, 7 and 8. A compression spring like the spring 64 could have its end 68 anchored in hole 70a, and its end 66 anchored in hole 72a. Then the spring would resist longitudinal separation of the halves 10, 12 to the FIG. 7 position, as will be now understood.

Another embodiment of the invention is illustrated in FIGS. 9–13. The connector device shown in these figures is in many respects similar to that already described above, with the exception that the spring means is of a simpler compression type as distinguished from the extension type spring 64 illustrated in FIGS. 1–7. FIG. 9 reveals cables 76 having enlargements 78 which are nested in socket formations of cooperable body members or halves 80, 82. The body half 80 has sockets 84 and 86 adjacent its two ends, communicating respectively with end notches 88, 90. The body half 82 has sockets 92, 94 adjacent its ends, communicating with end notches 96, 98 respectively. The sockets 84, 94 cooperate to nest one of the cable enlargements 78, and the sockets 86, 92 cooperate to nest the other cable enlargement. The body halves 80, 82 have centrally disposed grooves 100, 102 intermediate their ends, in which there is accommodated a compression-type coil spring 104 the ends of which respectively engage shoulders 106 and 108 at opposite ends of the grooves 100, 102. The body halves 80, 82 are encircled by finger engageable collars 110, 112 connected by pins 114, 116 respectively to the halves 82, 80.

FIG. 10 illustrates the open position of the connector or coupling, as effected by pulling apart or separating the collars 110, 112 against the action of the compression spring 104. It will be noticed that such spring is fully compressed, and that when the separating force is removed from the collars 110, 112 the spring 104 will expand to the position illustrated in FIG. 9, bringing the body halves 80, 82 into registration, that is, into coextensive positions.

Operation of the connector illustrated in FIGS. 9–13 is similar to that of FIGS. 1–8. With the parts in the positions of FIG. 10, the cable enlargements may be inserted in or removed from the connector. When the cable enlargements are nested in the connector as illustrated in FIG. 9, the spring 104 and also the tensile forces in the cables 76 will tend to maintain the locking or aligning positions of the body halves whereby the cables are held captive. Removal of most of the load from the cable 76 is necessary in order to shift the body halves longitudinally out of their coextensive positions to the open positions of FIG. 10 for release of the cables.

Yet another embodiment of the invention is illustrated in FIG. 14. This embodiment is generally similar to that of FIGS. 9–13, except that the configuration of the body halves is somewhat slightly different in order to effect a more complete confinement of the compression coil spring. In FIG. 14, the body halves 80a, 82a have centrally disposed grooves 100a, 102a, which are of greater length than the corresponding grooves 100, 102 as shown in FIGS. 9–12. The walls of such longer grooves effect a more complete confinement of the compression spring 104, as is readily seen from an inspection of FIG. 14. Otherwise, the construction and operation of the connector of FIG. 14 is in general similar to that of FIGS. 9–13.

It will now be understood from the foregoing that I have provided a novel and improved, greatly simplified quick-release connector device adapted for securing together the ends of cables, strands and the like, which have enlargements thereon. The quick-release connector is seen to be wholly enclosed with respect to the spring means and major portions of the sockets which receive the cable enlargements, as well as with respect to the groove surfaces of the body members. When the connector is assembled with cables as shown in FIG. 3, it cannot be released without first removing at least most of the load from the cables to enable these to be shifted inward, and such action insures against inadvertent release of the connector while under load. Further, increases in the load on the cables will only tend to make the connector hold these more securely, since the enlargements 18 of the cables while being nested in the sockets of the body members, positively prevent that relative movement of such members which is necessary to effect the cable release. Relatively few parts are involved in the connector, and the duplication of shapes results in a manufacturing economy whereby the cost of producing the connector is held to a low figure. The connector is sturdy and resistant to failure, and may be easily operated to effect the securement and release of the cables. The closed construction of the connector minimizes the likelihood of dirt and other foreign matter getting inside and interfering with its proper operation. Due to the self-locking action of the cable enlargements when the cables are experiencing loads, the coupling devices have utility without relying on any spring action. Thus the springs shown herein may be dispensed with, in those uses where automatic lock-up is not essential and instead where manual restoring of the coupling halves to the locking positions can be resorted to.

Variations and modifications are possible, and portions of the improvement may be used without others.

I claim:

1. A quick-release coupling comprising, in combination:
   (a) a first elongate body member having a pair of sockets in one side, disposed respectively adjacent and opening into its ends and adapted to receive bulbous enlargements on parts which are to be joined, said sockets having both side and end openings,
   (b) a pair of slide cover parts disposed on and cooperable with the body member, one slide part being movable along the member and the other slide part having a driving connection with the member,
   (c) a second elongate body member similar to the first member and disposed alongside and coextensive with the first member and longitudinally slidable thereon, said second body member having in a side facing said one side of the first member a pair of sockets disposed respectively adjacent and opening into its ends and cooperable respectively with the sockets of the first member for receiving said bulbous enlargements, said sockets having both side and end openings,
   (d) said slide parts being also disposed on and cooperable with the second body member and holding the members against lateral separation while permitting relative longitudinal movements thereof, the other of said slide parts being movable along the second body member and said one slide part having a driving connection with said second member whereby relative movement of the slide parts effects relative longitudinal movement of the body members to provide side access to the sockets in the sides thereof,
   (e) a coil spring disposed inside the body members and having its ends engaged with the body member and maintained thereby out of contact with enlargements disposed in said sockets, said spring biasing the members to positions wherein they are coextensive and the sides of the said sockets are covered by the members,
   (f) said slide parts comprising collars encircling the body members, said collars being aligned with each other and having respective ends normally closely juxtaposed when the body members are free of the bulbous enlargements and are coextensive with each other,
   (g) said collars jointly substantially completely enclosing the sides of the body members when the collar ends are thus closely juxtaposed, thereby jointly constituting a substantially unbroken covering for the two members and simultaneously constituting adjoining finger grips each of which is drivingly connected to one member and encircles substantially one-half the lengths of both members at the time the members are coextensive with each other.

2. A coupling as in claim 1, wherein:
(a) the body members have centered longitudinal grooves disposed in the said sides thereof and intermediate their ends,
(b) said grooves together constituting a central bore of the body members,
(c) said body members having abutment shoulders at the ends of said grooves,
(d) said spring being of the compression type and having its ends engaged with said abutment shoulders.

3. A coupling as in claim 1, wherein:
(a) the collar pieces comprise complete rings completely encircling and movable on the body members,
(b) said driving connections comprising abutment shoulders on the body members, engageable with said collar pieces to prevent relative uni-directional movement of the pieces and members.

4. A coupling as in claim 3, wherein:
(a) the abutment shoulders of the body members comprise semi-circular flanges at the ends of said members.

5. A coupling as in claim 1, wherein:
(a) the body members are identical to each other.

6. A coupling as in claim 1, wherein:
(a) the collars are respectively pin-connected to said members.

7. A quick release coupling comprising, in combination:
(a) a first elongate body member having a pair of sockets in one side, disposed respectively adjacent and opening into its ends and adapted to receive bulbous enlargements on parts which are to be joined, said sockets having both side and end openings,
(b) a pair of slide parts disposed on and cooperable with the body member, one slide part being movable along the member and the other slide part having a driving connection with the member, wherein the improvement comprises:
(c) a second elongate body member disposed alongside and coextensive with the first member and longitudinally slidable theron, said second body member having in a side facing said one side of the first member a pair of sockets disposed respectively adjacent and opening into its end and cooperable respectively with the sockets of the first member for receiving said bulbous enlargements, said sockets having both side and end openings,
(d) said slide parts being also disposed on and cooperable with the second body member and holding the members against lateral separation while permitting relative longitudinal movements thereof, the other of said slide parts being movable along the second body member and said one slide part having a driving connection with said second member whereby relative movement of the slide parts effects relative longitudinal movement of the body members to provide side access to the sockets in the sides thereof,
(e) said body members having centered longitudinal grooves disposed in the said sides thereof and intermediate their ends,
(f) said grooves together constituting a central bore of the body members, and
(g) spring means biasing the body members to positions wherein they are coextensive and the sides of the said sockets are covered by the body members, said spring means comprising a helical spring disposed in said bore and having its ends engaged respectively to said body members,
(h) said body members having transverse holes at the grooves thereof,
(i) said spring being of the extension type and having out-turned ends disposed in said holes so as to connect the spring at its ends to the body members.

References Cited
UNITED STATES PATENTS 3,332,117    7/1967    McCarthy _____ 287—80 X
3,378,891    4/1968    Metz.

FOREIGN PATENTS 788,656    10/1935    France.
33,986    1/1922    Norway.

BERNARD A. GELAK, Primary Examiner

U.S. Cl. X.R.
287—80; 24—230